Feb. 27, 1934.   K. L. SMITH   1,949,189
TIE STALL
Filed May 11, 1931   3 Sheets-Sheet 3

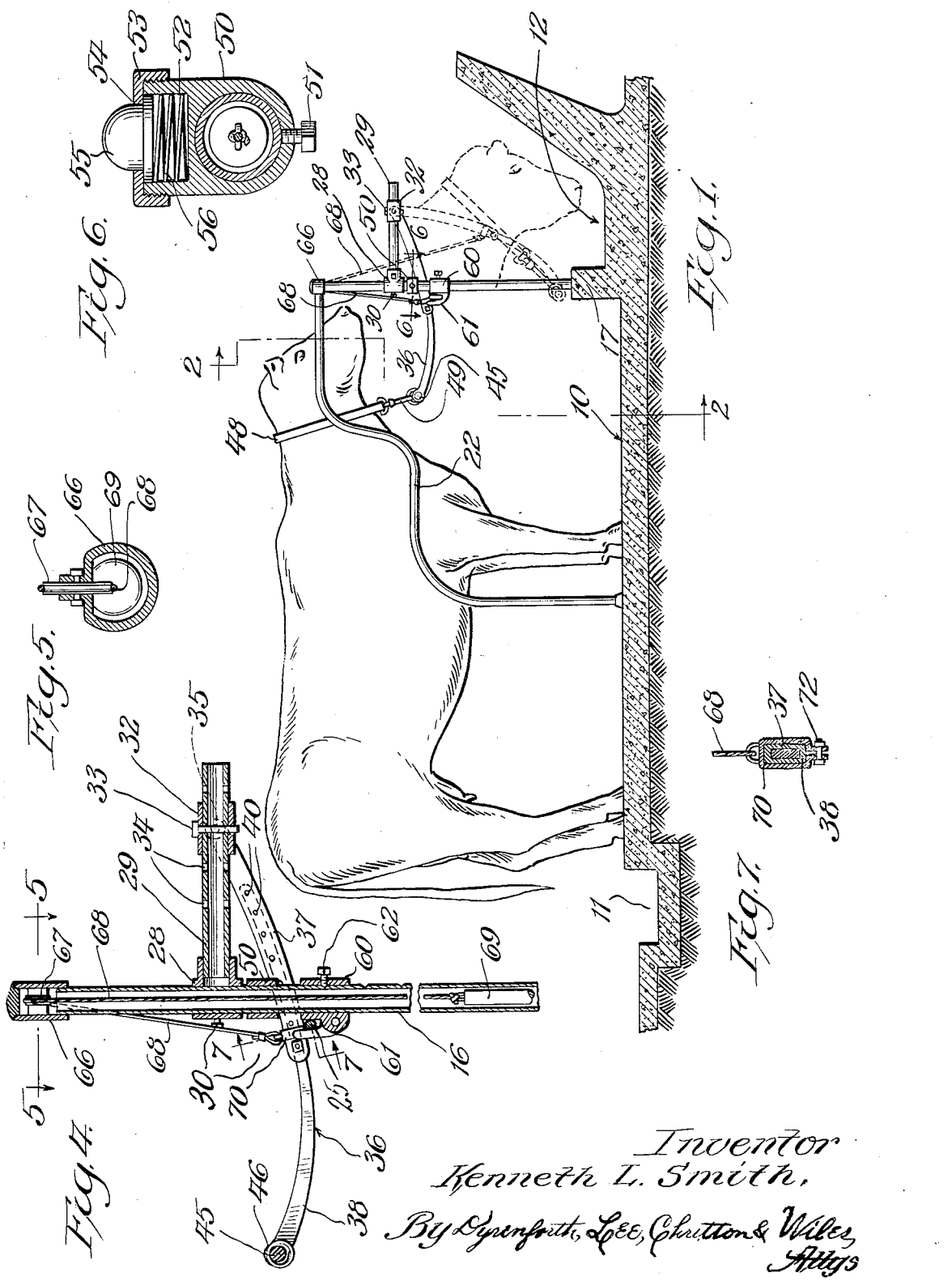

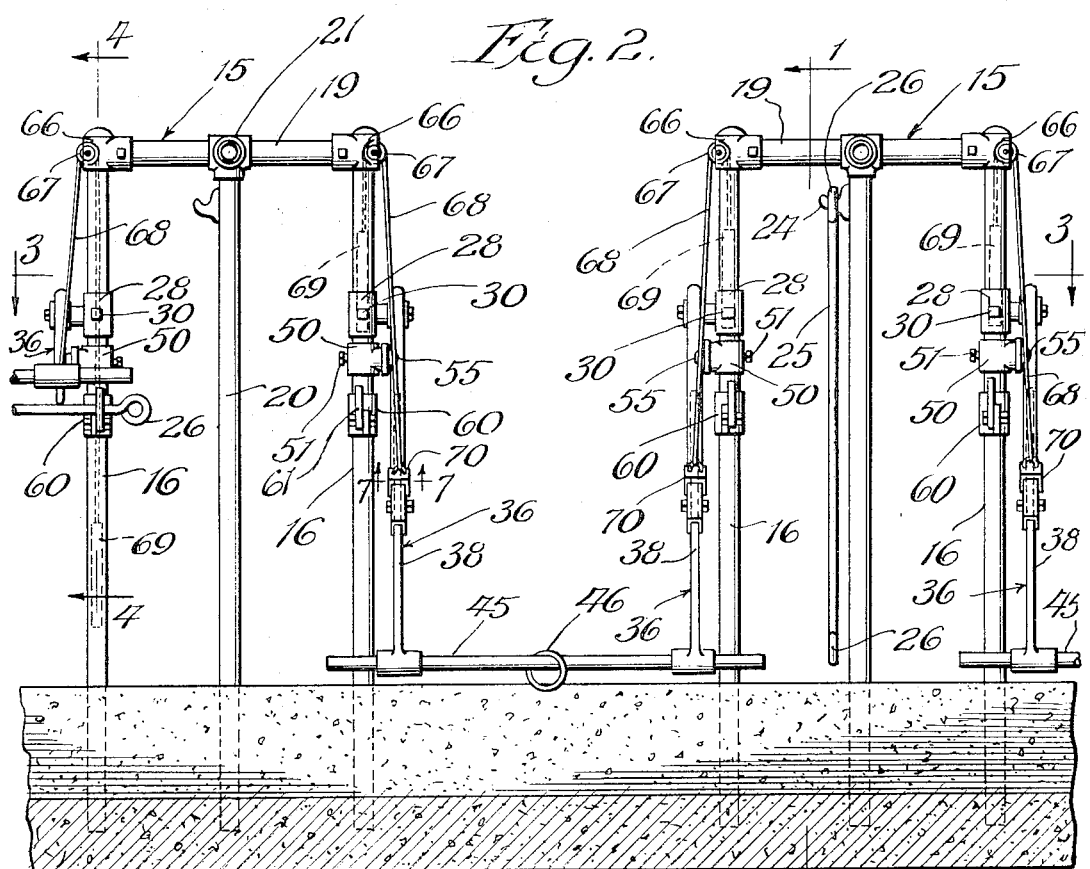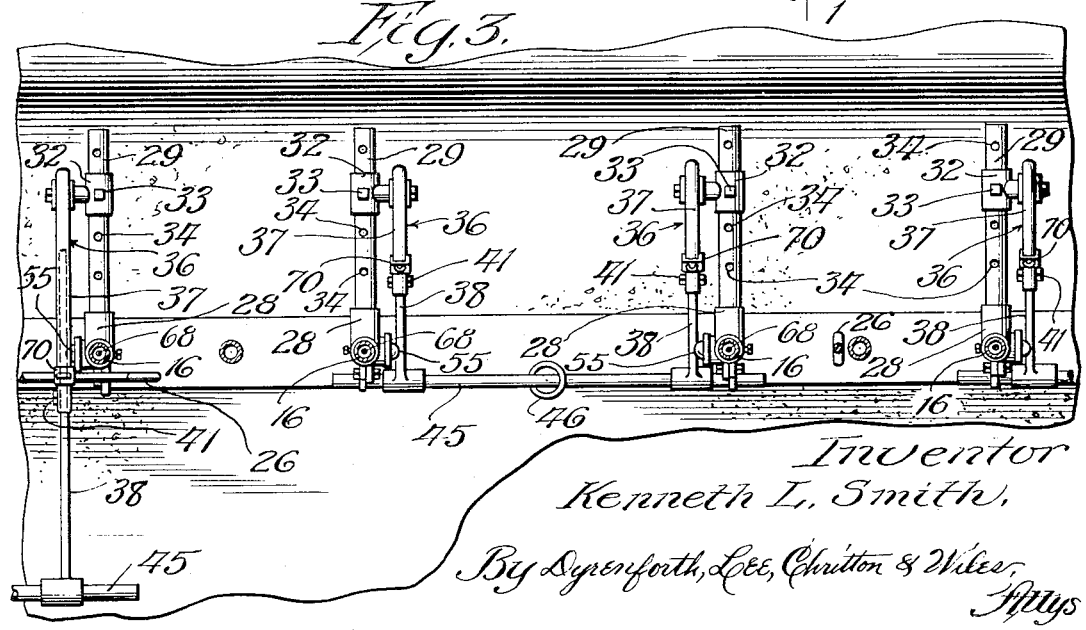

Inventor
Kenneth L. Smith,
By Dyrenforth, Lee, Chritton & Wiles Attys

Patented Feb. 27, 1934

1,949,189

UNITED STATES PATENT OFFICE 1,949,189

TIE STALL

Kenneth L. Smith, Des Plaines, Ill.

Application May 11, 1931. Serial No. 536,530

16 Claims. (Cl. 119—119)

The invention relates to tie stalls and has as its primary object the provision of improved apparatus for securing an animal in a tie stall, which apparatus will insure that the animal will remain clean and will be comfortable and at ease at all times.

One form of the invention is embodied in a stall which has a feed trough and a gutter. A pair of standards has a pair of arms pivoted thereto, the arms being adjustable as to length and being mounted so that they may be adjusted on the standards for the varying height and length of cattle in the stall. Extending between the free ends of the arms is a bar upon which a ring is loosely and slidably journaled. The animal is attached to this ring by a snap-catch, or the like, and may be secured in or released from the stall with very little effort.

The swinging arms and the manner in which the animal is attached to the bar extending between the arms insure that the animal may assume a comfortable position when it is resting, and also insure that the animal will be forced into a proper position with respect to the gutter when it is standing up.

Other objects and advantages will become apparent as the following detailed description progresses, reference being had to the accompanying drawings, wherein:—

Figure 1 is a longitudinal section through a tie stall which embodies the invention, the section being taken on line 1—1 of Fig. 2;

Fig. 2 is an enlarged section taken on line 2—2 of Fig. 1, parts of the adjacent stalls being also shown in this figure;

Fig. 3 is a section taken on line 3—3 of Fig. 2;

Fig. 4 is an enlarged section taken on line 4—4 of Fig. 2;

Fig. 5 is an enlarged section taken on line 5—5 of Fig. 4;

Fig. 6 is an enlarged section taken on line 6—6 of Fig. 1;

Fig. 7 is an enlarged section taken on line 7—7 of Fig. 4;

Figure 8:
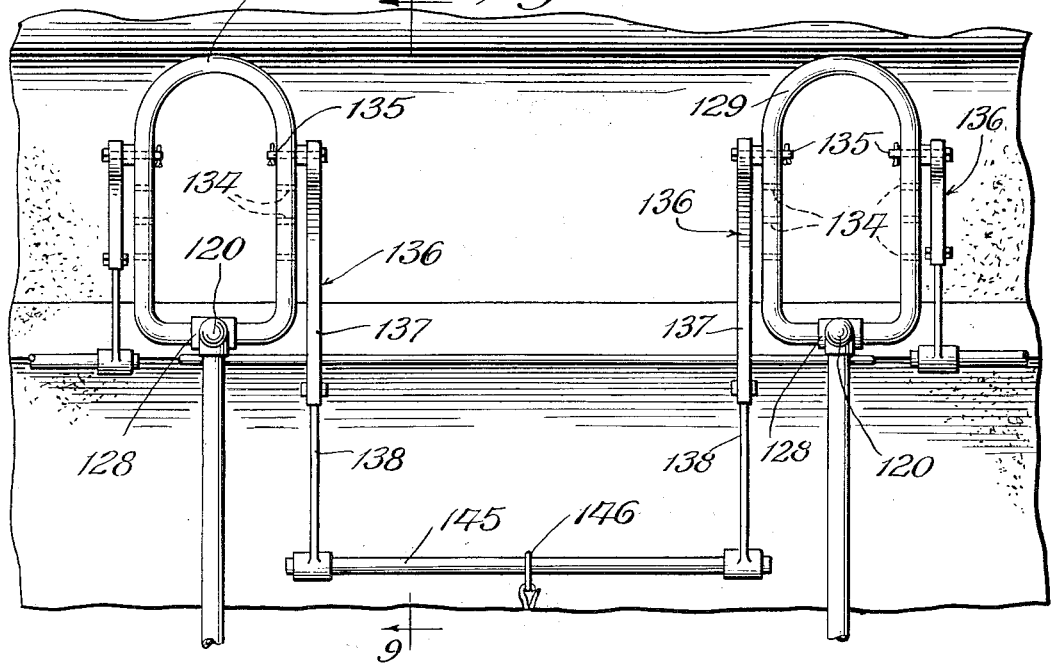
Fig. 8 is a fragmentary plan view of a tie stall which embodies another form of the invention.

Referring for the present to Figs. 1 to 7, inclusive, wherein a preferred form of the invention is illustrated, the reference character 10 designates the floor of the improved tie stall. A gutter 11 is provided at the back end of the floor 10 and a feed trough 12 is provided at the forward end.

As best shown in Figs. 2 and 3, adjacent stalls are separated by fabricated standards which are designated generally by the reference character 15. In this instance, each standard 15 comprises two vertically disposed rods or pipes 16 which have their lower ends embedded in a relatively low wall 17 which divides the floor 10 from the feed trough 12. The upper ends of each pair of pipes 16 are connected to each other by a pipe section 19, suitable fittings being provided for this purpose. Intermediate each pair of pipes 16 is a vertically disposed pipe 20 which also has its lower end embedded in the wall 17 and is connected to a pipe 19 by a pipe fitting 21. Extending rearwardly from the pipe 20 are bent pipes 22 which have their forward ends secured to the fittings 21 and have their back ends embedded in the floor 10. The bent pipes 22 form partitions between the stalls and confine each animal to its allotted space.

A hook 24 is provided at the upper end of each pipe 20 so that a rod 25 may be suspended therefrom. The rods 25 are provided with eyes 26 at the ends thereof so that they may be suspended from the hooks. The purpose of this construction will presently appear.

Adjustably secured to each of the vertically disposed pipes 16 is a T fitting 28 from which a horizontally disposed pipe section 29 projects (see Figs. 3 and 4). Each fitting 28 is provided with a set screw 30 which may be manipulated to secure the fitting 28 in a plurality of adjusted positions upon the associated pipe 16. Each pipe section 29 carries a fitting 32, each fitting 32 being provided with a bolt 33, or the equivalent, which may be fitted through the fitting 32 and apertures 34 in the associated pipe 29 to secure the fitting in adjusted positions along the pipe section.

Pivoted upon a pin 35 projecting from the fitting 32 is an arcuate arm which is designated, generally, by the reference character 36. Each arm 36 preferably comprises an arm section 37 pivoted on the pin 35 and an arm section 38 which is adjustably secured to the free end of the arm section 37 and forms a continuation thereof. The arm sections 38 are provided with holes 40, the construction being such that bolts 41 may be passed through the free ends of the arm sections 37 and through the holes 40 to secure the arm sections 38 in adjusted positions with respect to the arm sections 37. This permits the arms 36 to be lengthened or shortened to compensate for the varying lengths and heights of the cattle.

Extending between the free ends of the arms 36 associated with each stall is a rod or bar 45 upon which a ring 46 is loosely and slidably mounted. As illustrated in Fig. 1, the animal is provided with a neck band or strap 48 which carries a snap-catch 49, or the equivalent, whereby the animal may be attached to the ring 46.

Slidably mounted on each pipe 16 is a fitting 50 provided with a set screw 51 which may be manipuated to secure the fitting in a plurality of adjusted positions on the associated pipe 16 (see Figs. 4 and 6). Each fitting 50 is provided with a recess 52 which is closed at its outer end by a cap 53 having an aperture 54. Projecting through the aperture 54 is a stop member 55, the stop member 55 being urged into its functionally operative position by a helical compression spring 56 seated in the recess 52 (see Fig. 6). As best shown in Figs. 2 and 3, the fitting 50 are preferably secured to the pipe 16 in positions wherein they are above the positions the arms 36 assume when the animal is in its stall. However, it will be readily understood that the arms 36 may be displaced upwardly to snap by the stop members 55 and will then be retained in their raised positions by the stop members. The purpose of this construction will presently appear.

Fittings 60 provided with hooks 61 are adjustably secured on the pipes 16, each fitting 60 being provided with set-screws 62 which may be manipulated to secure the fitting in an adjusted position upon the associated pipe 16. When a cow is to be milked and it is desirable to cause her to refrain from eating or lowering her head, one of the rods 25 may be held in a horizontal position by the two hooks 61 provided for each stall so that the arms 36 cannot be lowered. This use of the rod 25 also insures that the cow will be standing in such position that the partition or pipes 22 will not interfere with the person doing the milking.

Secured to the upper end of each pipe 16 is a tubular fitting 66 in which a sheave 67 is rotatably journaled. Trained over each sheave 67 is a cable 68 which has one of its ends attached to a weight 69 suspended in the associated pipe 16. The other end of the cable is attached to an adjustable clamp 70 carried by the free end of the associated arm section 37 (see Fig. 7). As shown, each clamp 70 is formed as a split sleeve which is slidably journaled on the associated arm section 37 and may be clamped in an adjusted position upon the arm section by tightening a bolt 72 carried by the clamp.

The operation of the above described apparatus is substantially as follows: When an animal has been assigned to a stall, the arcuate arms 36 and the pipe sections 29 which carry them are adjusted to the height and position of the animal. The fittings 32 are secured to the pipe sections 29 so that the animal will be correctly positioned with respect to the gutter when it is standing. The pipe sections are brought to a level which insures that the bar 45 will not be raised above the pivotal axis of the arms 36 when the animal is standing for if the bar were brought up too high and the animal moved forwards, there would be some tendency on the part of the strap 48 to choke and irritate the animal. As illustrated in Fig. 1, the arcuate arms 36 may be lowered by the animal so that it may reach the feed trough with little effort. The arms 36 are counterbalanced by the weights 69 and, therefore, the animal does not carry the full weight of the arcuate arms and the rod or bar 45 extending therebetween. When the cow lies down, the ring 46 may slide along the bar 45 freely and, therefore, the cow may adjust herself to a comfortable position.

When the animal is unhooked from the ring 46, the arms 36 are preferably displaced upwards to have the arm sections 37 pass above associated stop members 55 which then retain the arms 36 in their elevated positions until the animal is returned to its stall. Then, after the animal has been attached to the ring 46, the arms 36 are pushed downwards past the stop members 55. This construction obviates the necessity of reaching down for the bar 45 when the animal is returned to its stall.

In the preferred construction, the weights 69 do not counterbalance the entire weight of the arms 31 and the bar 45, the construction being such that unless the arms 36 are held up by the animal, or by the stop members 55 they will drop into a position adjacent the one in which they are shown in dotted lines in Fig. 1.

The arms 36 are preferably arcuate so that they aid in preventing the animal from reaching into adjacent feed troughs to consume the feed of another animal.

Referring to Fig. 2, it will be noted that the bar 45 is of sufficient length so that the ends of the bar engage the uprights or pipes 16 when the bar is in its lowermost position. In other words, the pipe 16 functions as a stop for the bar. This prevents the animal from advancing too far forward in its stall and also prevents the bar from dropping into a position wherein it can not be readily reached by one who wishes to bring the bar into a position wherein the animal may be attached to the bar.

Figure 9:
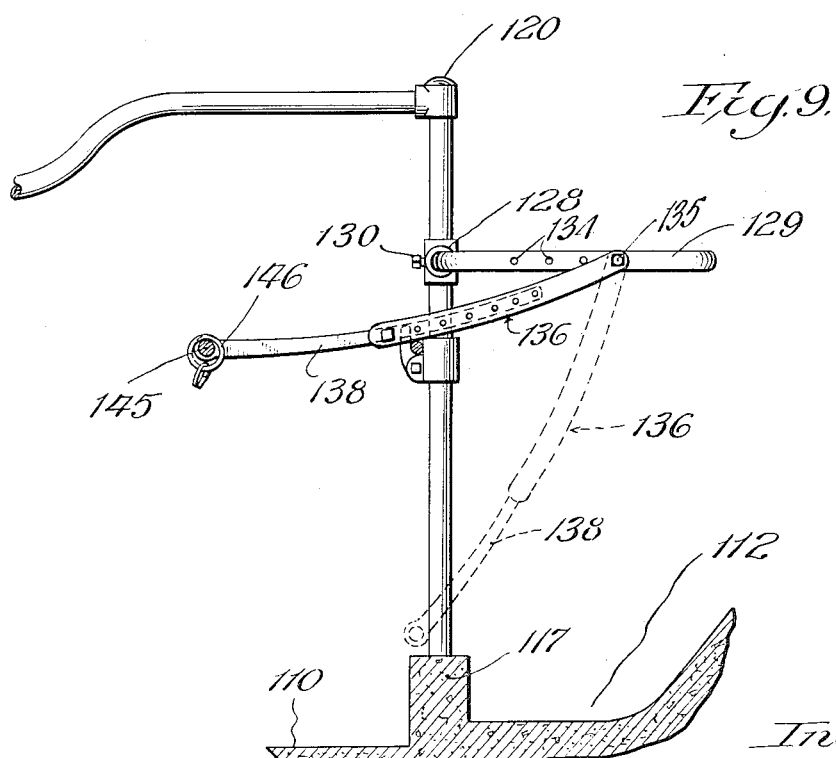
Fig. 9 is a section taken on line 9—9 of Fig. 8.

Another form of the invention is illustrated in Figs. 8 and 9. The construction shown in these two figures is particularly adapted to be used in the replacing of stanchions by apparatus having the advantages of the apparatus shown in Figs. 1 to 7, inclusive. The stalls shown in Figs. 8 and 9 are provided with a floor 110 and a feed trough 112, the floor 110 being spaced from the feed trough 112 by a relatively low wall 117. Disposed between each of the stalls is a vertical post or standard 120, the standards 120 being the standards to which the stanchions are usually secured. The lower ends of the standards 120 are embedded in the wall 117.

A fitting 128 is slidably mounted on each of the standards 120 and may be secured in a plurality of adjusted positions thereon by a set-screw 130 which is screw-threaded into the fitting 128. Rigidly secured to each fitting 128 is a bracket 129, preferably formed from pipe, the pipe being bent to provide a U-shaped member having inturned ends which are secured in the fittings 128. Each leg of each bracket 129 is provided with a plurality of bolt holes 134. A bolt 135 is provided for each leg and to these bolts arms 136 are pivoted, the arms 136 being preferably identical in construction with the arms 36 described above. Thus, each arm 136 comprises an arm section 137 pivoted to the associated bolt 135, and each arm section 137 has an arm section 138 adjustably secured to it at its free end. A bar 145 is carried by the arms 136 of each stall and is provided with a ring 146. The bar 145 and the ring 146 are preferably identical in construction with and have the same functions as the bar 45 and the ring 46 described above.

The apparatus shown in Figs. 8 and 9 is utilized in substantially the same manner as the apparatus shown in Figs. 1 to 7, inclusive. Thus, the arms 136 and the brackets 129 may be adjusted and brought into adjusted positions to accommodate animals of various sizes.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A tie stall comprising standards, fittings adjustably mounted on said standards means for adjusting said fittings on the standards, pipes mounted on said fittings, extensible arms pivoted on said pipes, and a horizontally disposed bar carried by said arms, said bar having a member to which an animal may be detachably secured.

2. A tie stall composing vertically disposed posts, horizontally disposed posts adjustably secured to said vertically disposed posts, means for adjusting the position of the horizontal posts with respect to the vertical posts, adjustable fittings adjustably mounted on said horizontally disposed posts, arms pivoted on said fittings, and means carried by said arms to which the animal may be detachably secured.

3. A tie stall comprising a framework, members mounted on said framework and adapted to be adjusted upwards and downwards thereon, means for securing said members in adjusted positions on the framework, fittings carried by said members and adjustable horizontally thereon, means for securing said fittings in adjusted positions on said members, arms pivoted to said fittings and means carried by said arms to which the animal may be detachably secured.

4. A tie stall comprising a framework, members mounted on said framework, means for adjusting said members upward and downwards thereon, fittings carried by said members, means for adjusting the same thereon, and movable means carried by said fittings to which the animal may be detachably secured.

5. A tie stall comprising a framework, spaced arms pivoted on said framework, a member extending between and carried by said arms, to which member the animal may be detachably secured, and means for counterbalancing said arms and said member.

6. A tie stall comprising a framework, extensible arms pivoted on said framework, means carried by said arms and adapted to have the animal adjustably secured thereto, and means for counterbalancing said arms and said first-mentioned means.

7. A tie stall comprising a framework, spaced extensible arms pivoted to said framework, a member extending between and carried by said arms, to which member the animal may be detachably secured, and yielding stop members carried by said framework and adapted to hold said arms in raised position.

8. A tie stall comprising a framework, spaced extensible arms pivoted to said framework, a member carried by said arms, to which member the animal may be detachably secured, and a rod adapted to be mounted on said framework to hold said arms in a raised position.

9. A tie stall comprising vertically disposed posts, U-shaped bracket members secured to said posts, means for adjusting the position of the bracket members with respect to said posts, levers pivoted to said brackets, and means carried by said levers to which an animal may be detachably secured.

10. A tie stall comprising a framework, arm sections pivoted to said framework, extensible members means for adjustably securing said extensible members to said arm sections, and a bar extending between and secured to said extensible members, to which bar the animal may be detachably secured.

11. Apparatus for securing an animal in a stall, said apparatus comprising a framework adjustble to the length and height of the animal, and tethering means pivotally mounted on said framework, said means forcing an animal closely tied thereto to move backwards when it raises its head and permitting it to move forwards when it lowers its head.

12. A tie stall comprising a gutter, and extensible tethering means in the stall adapted to direct automatically the animal rearwardly into the proper position with respect to the gutter when it raises its head.

13. Apparatus for securing an animal in a stall, said apparatus comprising a frame having members adjustable to the height of the animal, and extensible tethering means, pivotally mounted on the first-mentioned members said tethering means serving to lead the animal forwardly or rearwardly according to the height that the animal moves its head.

14. Apparatus for securing an animal in a stall, said apparatus comprising a frame having vertically disposed pipes, fittings adjustably mounted on said pipes, members carried by said fittings pivoted on said members, fittings adjustably mounted on said members, extensible arms pivoted to the last-mentioned fittings, and a bar, to which the animal may be secured, carried by said extensible arms.

15. A tie stall comprising standards, fittings mounted on said standards, means for adjusting said fittings on the standards, pipes mounted on said fittings, arms pivoted on said pipes, and a horizontally disposed bar carried by said arms and impaling a ring to which an animal may be detachably secured.

16. Apparatus for securing an animal in a stall comprising standards, bar-supporting arms pivoted to said standards, and a horizontal bar to which an animal may be tethered, said bar being mounted in said arms so that said standards form stops to limit the swing thereof.

KENNETH L. SMITH.